United States Patent
Hand et al.

(10) Patent No.: US 10,651,558 B1
(45) Date of Patent: May 12, 2020

(54) OMNI ANTENNAS

(71) Applicant: Lockheed Martin Corporation, Bethesda, MD (US)

(72) Inventors: Thomas Henry Hand, Littleton, CO (US); R. Mark Clark, Castle Rock, CO (US); Erik Lier, Newtown, PA (US); Jeffrey Michael Loomis, Highlands Ranch, CO (US); Ryan Michael Paul, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 532 days.

(21) Appl. No.: 15/294,474

(22) Filed: Oct. 14, 2016

Related U.S. Application Data

(60) Provisional application No. 62/242,895, filed on Oct. 16, 2015.

(51) Int. Cl.
*H01Q 1/36* (2006.01)
*H01Q 9/16* (2006.01)
*H04B 7/185* (2006.01)

(52) U.S. Cl.
CPC .............. *H01Q 9/16* (2013.01); *H01Q 1/36* (2013.01); *H04B 7/18506* (2013.01)

(58) Field of Classification Search
CPC .. H01Q 1/36; H01Q 9/16; H01Q 13/02–13/04
USPC .................................... 343/772–777
See application file for complete search history.

(56) References Cited

U.S. PATENT DOCUMENTS

| | | | | | |
|---|---|---|---|---|---|
| 4,143,377 | A | * | 3/1979 | Salvat | H01Q 19/06 343/755 |
| 6,011,524 | A | * | 1/2000 | Jervis | H01Q 1/42 343/859 |
| 8,339,324 | B1 | * | 12/2012 | Dufilie | H01Q 1/42 343/725 |
| 9,843,099 | B2 | * | 12/2017 | Legay | H01Q 1/405 |
| 2003/0107524 | A1 | * | 6/2003 | Hart | H01Q 21/24 343/860 |
| 2009/0237314 | A1 | * | 9/2009 | Lalezari | H01Q 9/28 343/721 |
| 2012/0044119 | A1 | * | 2/2012 | Libonati | H01Q 9/28 343/807 |

* cited by examiner

*Primary Examiner* — Dameon E Levi
*Assistant Examiner* — Hasan Z Islam
(74) *Attorney, Agent, or Firm* — Morgan, Lewis & Bockius LLP

(57) ABSTRACT

An omni antenna assembly includes two antennas, a dipole antenna and a monocone antenna, to provide full spherical coverage. The dipole cavity for the dipole antenna forms one solid part with the monocone antenna. The monocone antenna also includes a monocone and a cylindrical shell connecting the dipole cavity to the monocone. A coaxial transition extends from the cylindrical shell to a matching network. The antenna assembly may be fabricated using additive manufacturing technology.

18 Claims, 8 Drawing Sheets

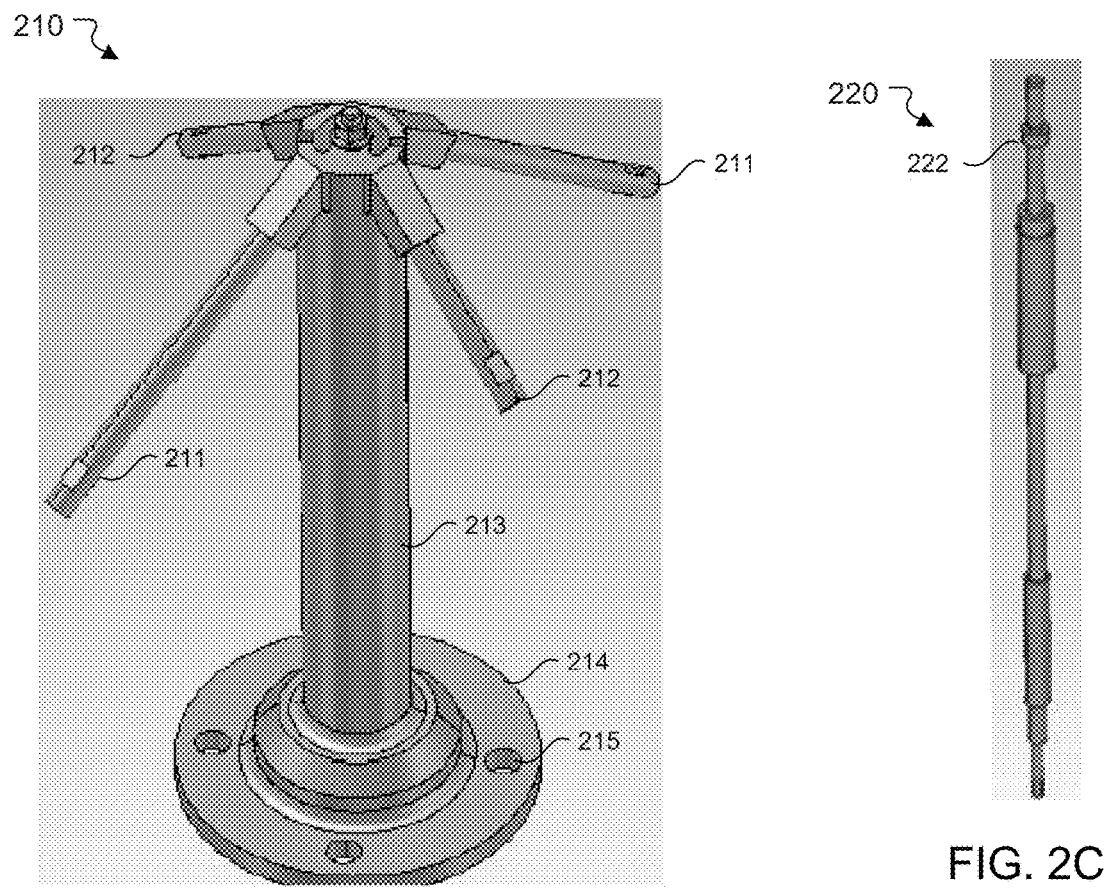
FIG. 2B
FIG. 2C
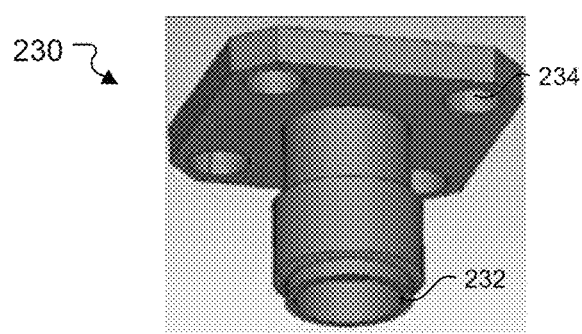
FIG. 2D
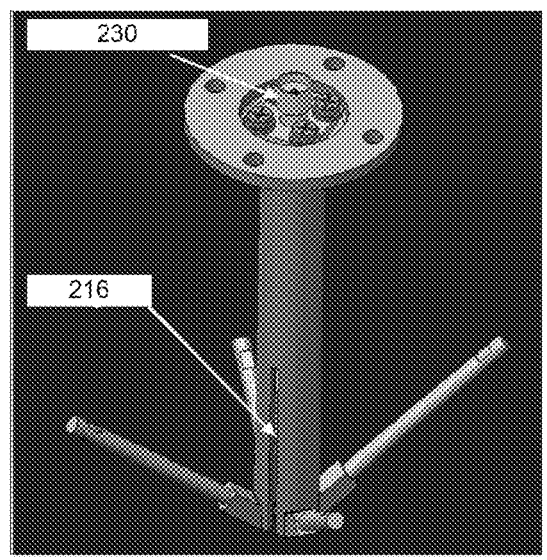
FIG. 2E

OMNI ANTENNAS

CROSS-REFERENCE TO RELATED APPLICATIONS

This application claims the benefit of priority under 35 U.S.C. § 119 from U.S. Provisional Patent Application 62/242,895 filed Oct. 16, 2015, which is incorporated herein by reference in its entirety.

STATEMENT REGARDING FEDERALLY SPONSORED RESEARCH OR DEVELOPMENT

Not applicable.

FIELD OF THE INVENTION

The subject technology generally relates to antennas, and more particularly, to omni-directional antennas, also referred to as omni antennas. Omni antennas provide full spherical or hemispherical coverage to allow a spacecraft to communicate with a ground station regardless of the spacecraft's orientation in space.

BACKGROUND

In many types of space missions, antennas are utilized for transmission and reception of signals. Antenna designs may be complex and/or associated antennas may be expensive to build. The need for hemispherical or full spherical coverage may require antenna assemblies which combine two or more types of antennas. Conventional manufacturing techniques may limit antenna designs. For example, antenna designs using conventional manufacturing may require post-processing and machining operations in order to achieve required performance.

SUMMARY

According to aspects of the subject technology, an antenna is provided that may be utilized for transmission and reception of signals, such as in telemetry, tracking, and command (TT&C) applications. According to aspects of the subject technology, the antenna may be a common product antenna. According to aspects of the subject technology, the antenna may be fabricated using additive manufacturing technology.

According to aspects of the subject technology, an apparatus for an omni antenna is provided. The apparatus includes a conical structure including a base and a monocone cavity, and a cylindrical shell extending from the base and through the monocone cavity. The apparatus includes a coaxial transition extending radially outward from the cylindrical shell, and an impedance matching network, also referred to as a matching network. The matching network includes a rod having one or more bends within a plane perpendicular to an axis of the cylindrical shell and a transition bend out of the plane to connect to the coaxial transition. The coaxial transition and the matching network comprise a single integrated piece.

According to aspects of the subject technology, an omni antenna assembly is provided. The omni antenna assembly includes a dipole cavity structure including a cavity section and a corrugated section opposite the cavity section, and a conical structure including a base and a monocone cavity. The omni antenna assembly includes a cylindrical shell extending from the base and through the monocone cavity and connecting the dipole cavity structure to the conical structure. The dipole cavity structure, the conical structure, and the cylindrical shell comprise a single integrated piece.

According to aspects of the subject technology, an antenna is provided. The antenna includes a dipole antenna, a center conductor matching network within the dipole antenna, and a omni antenna assembly. The omni antenna assembly includes a dipole cavity structure including a cavity section and a corrugated section opposite the cavity section. The omni antenna assembly includes a conical structure comprising a base and a monocone cavity. The omni antenna assembly includes a cylindrical shell extending from the base and through the monocone cavity and connecting the dipole cavity structure to the conical structure. The omni antenna assembly includes a coaxial transition extending radially outward from the cylindrical shell. The coaxial transition has a generally circular cross section. The omni antenna assembly includes a matching network including a rod having one or more bends within a plane perpendicular to an axis of the cylindrical shell and a transition bend out of the plane to connect to the coaxial transition. The rod has a generally rectangular cross section. The omni antenna assembly includes a tapered portion connecting the coaxial transition and the matching network near the transition bend. The tapered portion has a cross section which tapers from the generally rectangular cross section to the generally circular cross section. The base includes a channel for housing the matching network. The monocone cavity includes an opening in a sidewall of the monocone cavity and the coaxial transition extends through the opening towards the base. The omni antenna assembly comprises a single integrated piece that may be realized, for example, by using the manufacturing attributes inherent with additive manufacturing.

In the following description, reference is made to the accompanying attachments that form a part thereof, and in which are shown by way of illustration, specific embodiments in which the subject technology may be practiced. It is to be understood that other embodiments may be utilized and changes may be made without departing from the scope of the subject technology.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 2B-2E show a dipole antenna of the antenna assembly of FIG. 2A, according to certain aspects;

DETAILED DESCRIPTION

The subject technology provides an antenna that may be utilized for telemetry, tracking, and command (TT&C)

applications. The antenna may be used in various applications and across multiple telecommunication platforms. Each of these applications and programs may utilize unique specifications, drawings, test procedures, fixtures, and so forth. For example, the antenna may be designed to allow operation in the S-band. The antenna may also be designed to allow operation in other bands, such as the C-band, Ku-band, and Ka-band, which are utilized in commercial platforms. The antenna may be a common product antenna that may be used across such platforms to allow a substantially lower cost and complexity. In some aspects, the antenna design may meet performance requirements without requiring complex post-processing and machining operations. In some aspects, the antenna design may be fabricated using additive manufacturing technology, rather than using conventional manufacturing techniques. In some aspects, additive manufacturing may be referred to as 3D printing. In some aspects, the antenna design may involve refreshing old designs using state of the art design/modeling tools. In some aspects, the TT&C antenna may be a TT&C omni antenna. In some aspects, the TT&C antenna may be a common product TT&C omni antenna.

According to aspects of the subject technology, the antenna (e.g., common product TT&C omni antenna) may facilitate development of a common antenna design (e.g., common TT&C omni antenna design) that may be utilized across various telecommunications platforms. In some cases, the antenna design may allow utilization of additive manufacturing technology to facilitate simplification of a baseline design complexity and/or facilitate complex part reduction, defect opportunities reduction, labor reduction (e.g., touch labor reduction), and/or material cost reduction, etc., while meeting radio frequency (RF) requirements for various government and/or commercial programs. For example, in some aspects, the antenna design may facilitate the elimination of tuning (e.g., RF tuning), soldering (e.g., hand-soldered joints), plating (e.g., silver plating), and/or unstable base. The simplification of the baseline design complexity, for example by designing most of the antenna assembly as one solid piece, may reduce touch labor and may allow for cost reduction.

In some aspects, antenna performance may be optimized over the 1,690 to 2,300 MHz band. In some aspects, antenna design tools may be utilized to develop a crossed dipole and monocone solution. In some aspects, coverage may be optimized over a crossed dipole and bicone field of view (FOV).

Figure 1A:
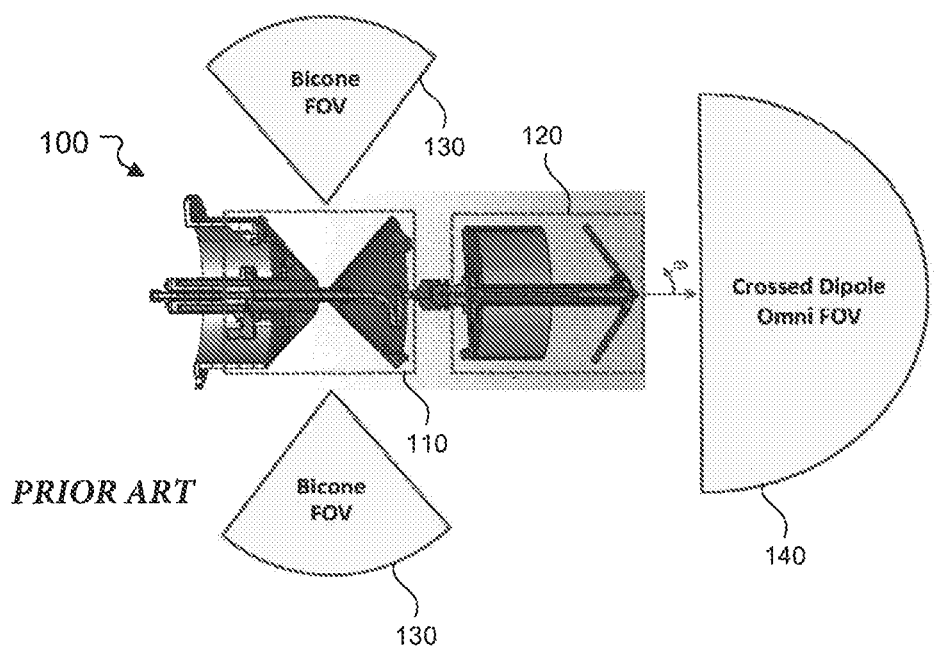
FIGS. 1A-1C illustrate a heritage antenna assembly.

FIG. 1A shows an antenna assembly 100, which may be a heritage omni antenna. The antenna assembly 100 includes a bicone antenna 110 and a dipole antenna 120. The bicone antenna 110 provides wide angle coverage as represented by bicone field-of-view (FOV) 130. The dipole antenna 120, which may be a crossed or drooped dipole, provides forward coverage as represented by crossed dipole omni FOV 140. Although FIG. 1A depicts the bicone FOV 130 and the crossed dipole omni FOV 140 as separate and unconnected for easier identification, the bicone FOV 130 and the crossed dipole omni FOV 140 may form hemispherical coverage, $2\pi$ steridian FOV. Two antenna assemblies 100, for example on either side of a vehicle, may be used to provide full spherical coverage.

Figure 1B:
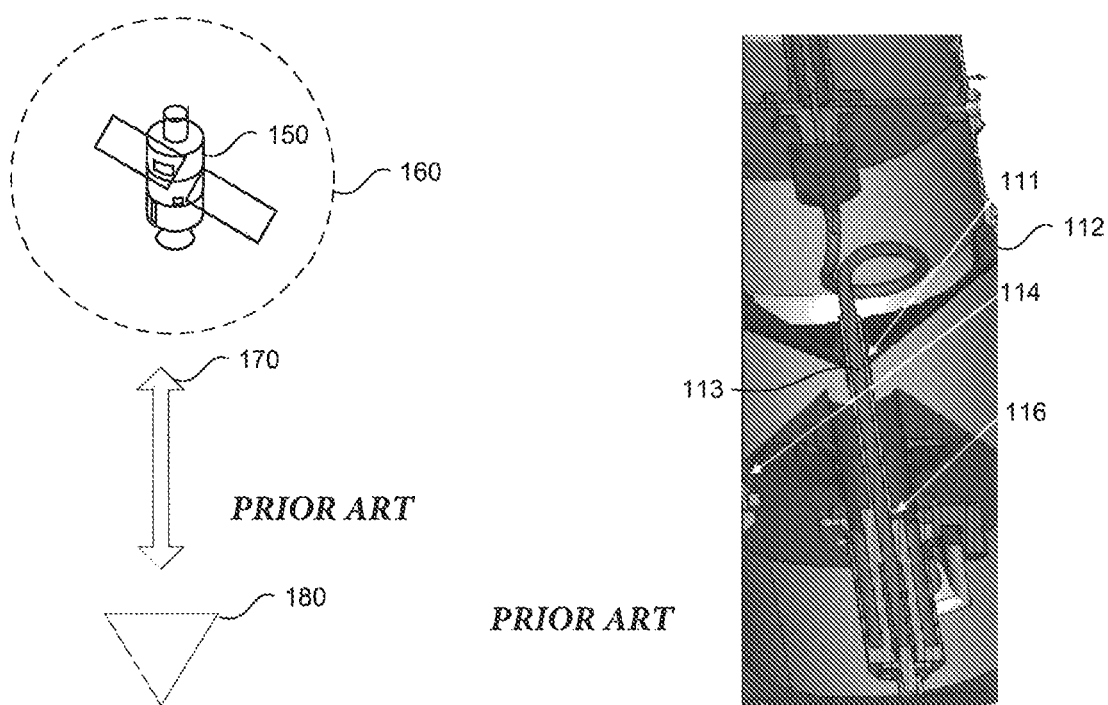

FIG. 1B shows a spacecraft 150, which may be a satellite or other vehicle. The spacecraft 150 communicates with a ground station 180 through communications 170, which includes transmission (Tx) and reception (Rx) of wireless signals. The spacecraft 150 has coverage 160, which may be a full spherical coverage or "bubble" formed by one or more antenna assemblies 100. The spacecraft 150 has two antenna assemblies 100, placed on opposite sides of the spacecraft 150 to achieve the coverage 160. The coverage 160, which is $4\pi$ steradian coverage (e.g. $2\pi$ steradian coverage from each antenna assembly 100), provides the spacecraft 150 with a full 360 degrees and 3D FOV for communicating with the ground station 180. This spherical FOV allows the spacecraft 150 to communicate with the ground station 180 independent of the orientation of the spacecraft 150 in space.

Figure 1C:
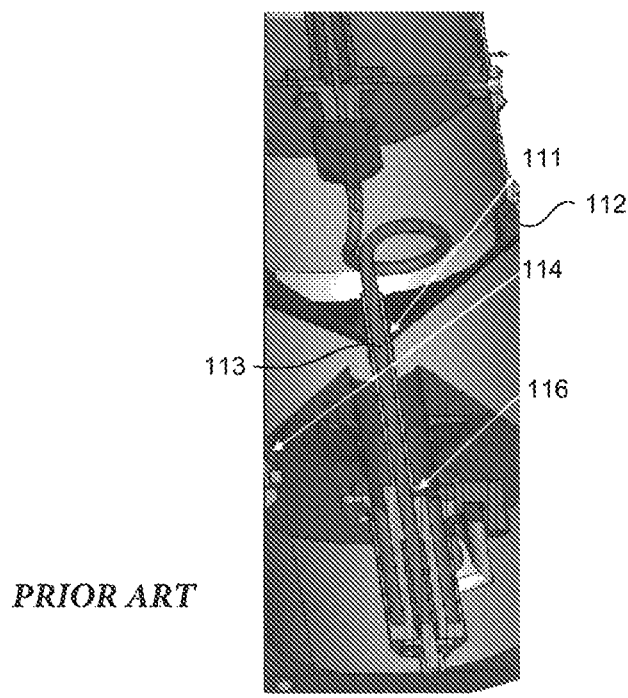

The antenna assembly 100 requires a complex design, which includes numerous individual and complex piece parts, manufacturing operations, and post-processing/machining to achieve the 3D FOV. FIG. 1C shows a close up view of a portion of the bicone antenna 110 in FIG. 1A. The bicone antenna 110 includes a top cone 112, a coax sheath 111, a dipole element 113, a bottom cone 114, and a coax center conductor 116. The antenna assembly 100 is fabricated by fabricating the bicone antenna 110 and the dipole antenna 120, and assembling the bicone antenna 110 and the dipole antenna 120 together. Although the heritage omni antenna design combines the bicone antenna 110 and the dipole antenna 120, the heritage omni antenna design alone does not fully address impedance matching.

Impedance matching involves designing an input impedance of an electrical load or an output impedance of its corresponding signal source to minimize signal reflection from the electrical load to maximize power transfer. Impedance matching improves antenna efficiency by allowing more power to be radiated by the antenna. In order for the antenna assembly 100 to match impedance and meet performance requirements, the antenna assembly 100 requires further complex manufacturing operations such as soldering, plating, and tuning.

For example, the coax sheath 111, which feeds the dipole element 113, must be electrically connected to the top cone 112. Therefore, the top cone 112 requires plating over a conductive material, such as aluminum. The bottom cone 114 requires tuning. For example, the bottom cone 114 may require shimming for an optimal gap for a given program requirement. The coax center conductor 116 requires soldering to a bicone launch cavity. This soldering may be difficult as it requires soldering a generally inaccessible location. These post-processing operations are iterative and repeated until adequate impedance matching is achieved. In addition, the various interactions and connections between independent mechanical components introduce passive intermodulation (PIM).

Figure 2A:
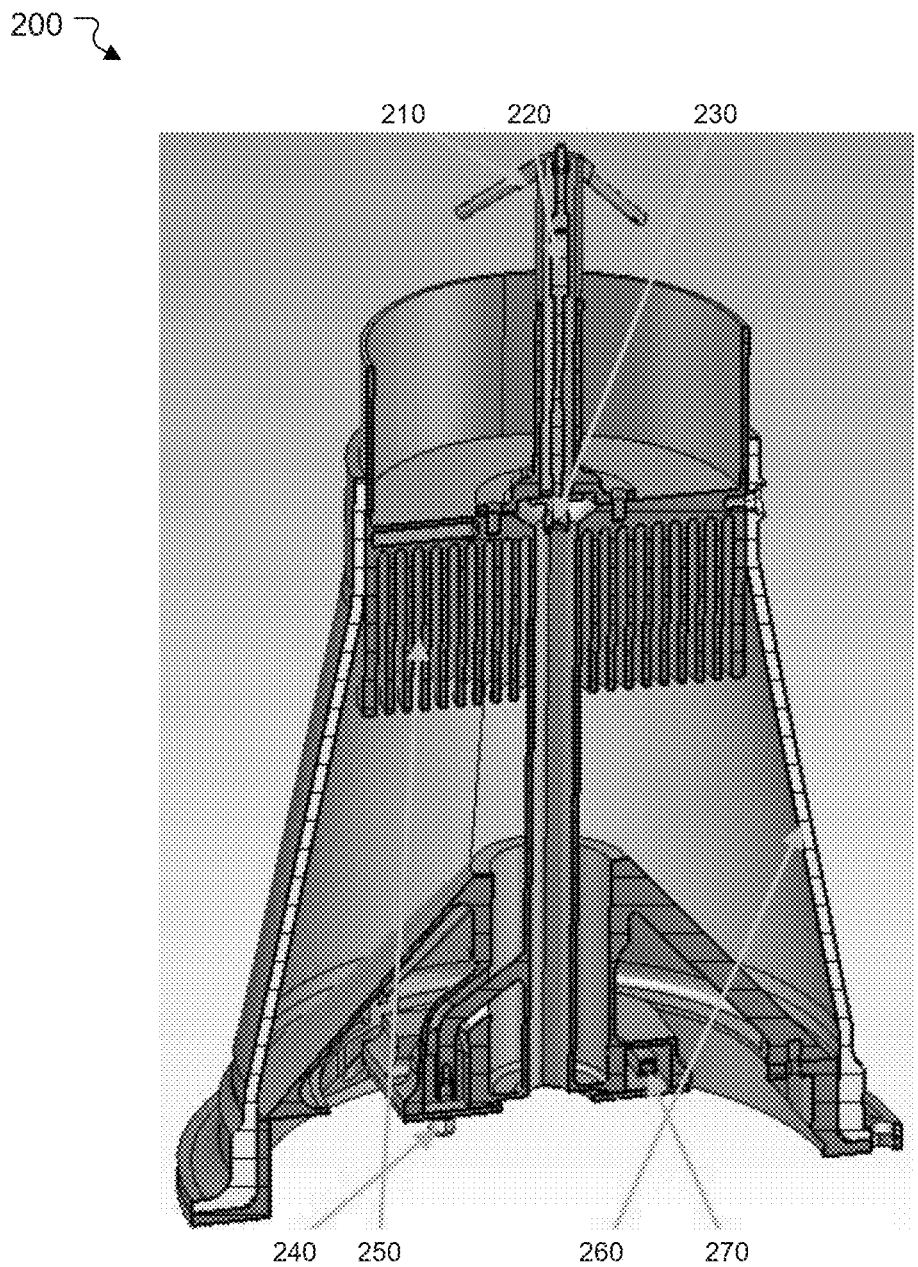
FIG. 2A shows an antenna assembly, according to certain aspects.

According to aspects of the subject technology, a single-piece impedance matching component obviates the need for post-processing operations such as soldering, plating, and tuning. FIG. 2A shows an antenna assembly 200, according to aspects of the subject technology. The antenna assembly 200 may be an omni antenna. The antenna assembly 200 includes a dipole antenna 210, a center conductor matching network 220, a dipole connector 230, a monocone connector 240, an omni antenna assembly 250, a radome 260, and a monocone matching network 270. The dimensions of the antenna assembly 200 may vary based on performance requirements, manufacturing capabilities, or other design considerations.

Similar to the antenna assembly 100, the antenna assembly 200 includes a structure for forward coverage, the dipole antenna 210, and a structure for wide angle coverage, the omni antenna assembly 250 which includes a monocone antenna. However, the antenna assembly 200 includes the monocone matching network 270. The monocone matching network 270 has a specific geometry which achieves impedance matching that meets performance requirements. In other words, the antenna assembly 200 presents a design, according to aspects, which does not require, for example, soldering, plating, and tuning to meet performance requirements.

The antenna assembly 200 includes a core antenna structure that is one single integrated piece and therefore impervious to PIM. The core antenna structure includes the omni antenna assembly 250. The core antenna structure may also include one or more of the dipole antenna 210, the center conductor matching network 220, the dipole connector 230, the monocone connector 240, and the monocone matching network 270. The core antenna structure may be produced by additive manufacturing. In addition, the monocone matching network 270, having a specific geometry and location within the omni antenna assembly 250, may be produced by additive manufacturing. The design of the antenna assembly 200 reduces a number of complex parts from that of the antenna assembly 100. The design of the antenna assembly 200 further reduces opportunities for defects, for example by eliminating hand-soldered joints, eliminating silver-plating, eliminating RF/mechanical tuning, and eliminating an unstable base. Using additive manufacturing may also reduce labor required and material costs.

However, a bicone antenna structure, such as the bicone antenna 110, may be difficult to produce using additive manufacturing. Thus, the monocone matching network 270 may not be readily adaptable for use in the bicone antenna 110. The omni antenna assembly 250 includes a monocone antenna structure rather than a bicone structure. However, a monocone antenna structure may unfavorably couple with the dipole antenna 210. To prevent coupling, the omni antenna assembly 250 further provides isolation between the monocone structure and the dipole antenna 210, as will be discussed further below.

FIG. 2B shows the dipole antenna 210. The dipole antenna 210 includes dipole arms 211, dipole arms 212, shaft 213, base 214, and mounting holes 215. The mounting holes 215 are used to attach the base 214 to the omni antenna assembly 250. However, the mounting holes 215 may not be needed if the dipole antenna 210 is manufactured as a single integrated piece with the omni antenna assembly 250. The dipole arms 211 are independent from the dipole arms 212. The dipole arms 211 have similar length and droop angle. The dipole arms 212 have similar length and droop angle. The configuration of the dipole arms 211 and 212 are based on performance requirements. The dipole antenna 210 is made of aluminum, but may be made of other conductive materials, which acts as an outer conductor. The dipole antenna 210 includes the center conductor matching network 220 as a center conductor. The shaft 213 is hollow to house the center conductor matching network 220. The droop angle, cavity height and diameter of a cavity section 252 (see FIG. 2F), and the shape of the center conductor matching network 220 are designed to operate over a wide bandwidth to meet encompassing program requirements.

FIG. 2C shows the center conductor matching network 220. The center conductor matching network 220 is a rod made of beryllium copper, but may be made of other conductive materials. The center conductor matching network 220 includes one or more tuning stubs 222. The stubs 222 have a different diameter than a main portion of the rod. The change in diameter or cross section size due to the stubs 222, along with a placement and number of stubs 222 provide impedance bandwidth match for the dipole antenna 210. The sequence of stubs 222 is based on performance requirements.

FIG. 2D shows the dipole connector 230. The dipole connector 230 includes mounting holes 234 and connector end 232. The dipole connector 230 is a sub-miniature version A (SMA) adapter, although the dipole connector 230 may be a different adapter as needed.

FIG. 2E shows a bottom view of the dipole antenna 210. The dipole connector 230 is mounted in a recess of the base 214. The shaft 213 also includes a tuning slot 216 for tuning the center conductor matching network 220.

Figure 2F:
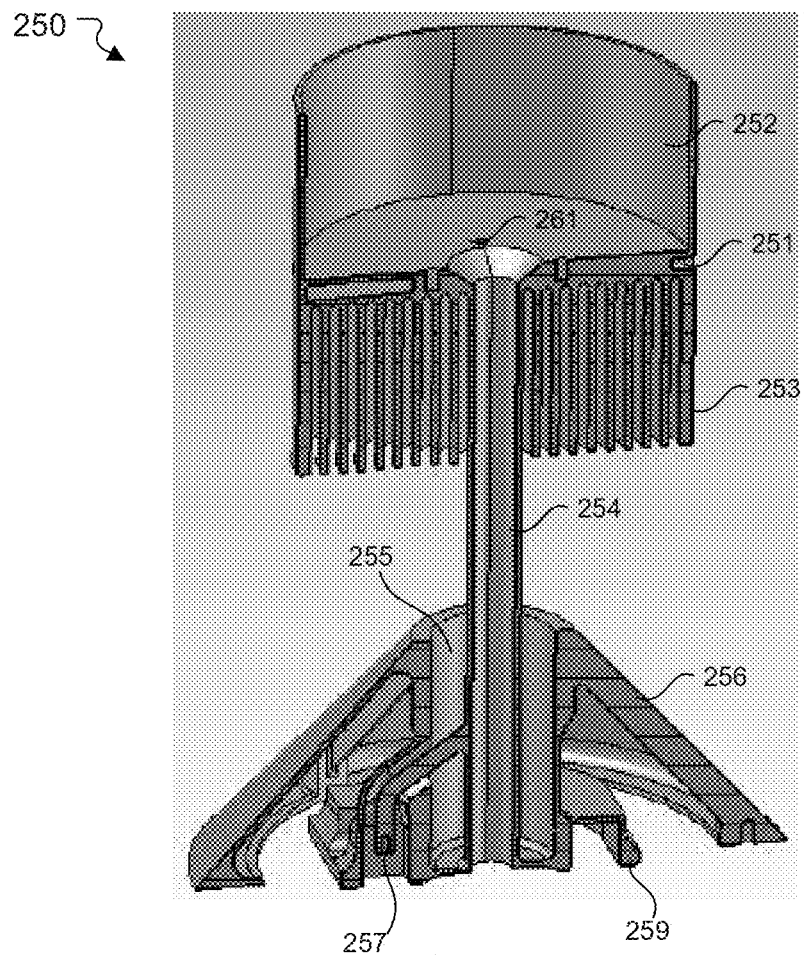
FIGS. 2F-2G show a omni antenna assembly of the antenna assembly of FIG. 2A, according to certain aspects.

FIG. 2F shows the omni antenna assembly 250. The omni antenna assembly 250 includes holes 261, a dipole cavity structure 251, cylindrical shell 254, monocone cavity 255, monocone 256, coaxial transition 257, and base 259. The omni antenna assembly 250 is made of a conductive material, such as aluminum. The omni antenna assembly 250 may be fabricated through an additive manufacturing process. The minimum wall thickness may vary based on performance requirements and manufacturing capabilities.

The dipole cavity structure 251 includes a cavity section 252 and a corrugated section 253, opposite the cavity section 252. The cavity section 252 is a hollow cylinder which houses the dipole antenna 210 (in FIG. 2A). A height and diameter of the cavity section 252 may be optimized with dimensions of the dipole antenna 210, based on performance requirements. The holes 261 are threaded to mount the dipole antenna 210. The holes 261 may not be needed if the dipole antenna 210 is manufactured as a single integrated piece with the omni antenna assembly 250. The cylindrical shell 254 is hollow to feed the dipole antenna 210 (see FIG. 2P).

Unlike the antenna assembly 100, which includes a bicone antenna 110, the antenna assembly 200 includes a monocone structure which includes the monocone 256, the cylindrical shell 254, the monocone cavity 255, and the base 259. As stated above, the additive manufacturing processes which may be suitable for producing the monocone matching network 270 may not be suitable for producing a bicone antenna. A geometry of the monocone 256 is designed to meet the heritage bicone requirements of 60-120 degree FOV. The monocone cavity 255 is also designed to provide impedance matching. However, due to the difference in operation between bicone antennas and monocone antennas, the monocone 256 can not directly replace the bicone antenna 110 without further modification. In the bicone antenna 110, an electric field radiates outward from between the top cone 112 and the bottom cone 114, bends around the top cone 112 and the bottom cone 114, and further radiates outward without coupling with the dipole antenna 120. In the monocone antenna, an electric field radiates outward from the cylindrical shell 254 and out of the monocone cavity 255. If the corrugated section 253 were not present, the electric field would diffract around the cavity section 252 and into the dipole antenna 210, causing interference. The corrugated section 253 prevents such degradation.

The corrugated section 253 includes radial corrugations for isolating the monocone 256 from the dipole antenna 210. The radial corrugations are concentric rings, although the corrugated section 253 may comprise another metamaterial. The corrugations have a distance of at most ⅕ wavelength (λ/5) between each ring. The corrugations are typically one quarter the free space wavelength (λ/4) deep at the center of the operating frequency band, which transforms a short at the bottom of the corrugations to an open at the top of the corrugations for an electromagnetic wave with polarization normal to the surface. This feature stops surface waves from propagating. The low fields at the rims of the corrugations minimize coupling from the monocone 256 to the dipole antenna 210.

Figure 2G:
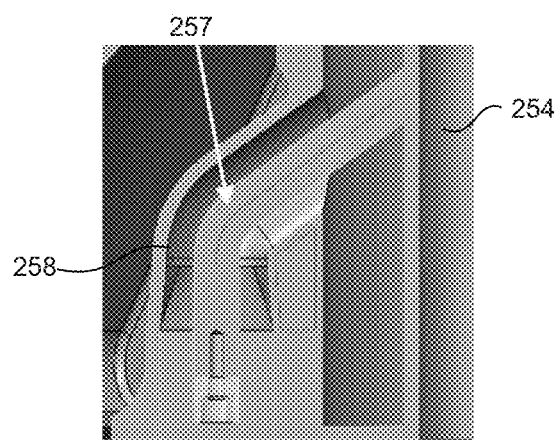

FIG. 2G shows a close up view of the coaxial transition 257. In FIG. 2G, the coaxial transition 257 branches or extends radially outward from the cylindrical shell 254 at about 45 degrees before tapering vertically, e.g. parallel to the cylindrical shell 254. The coaxial transition 257 may branch out at a different angle such as 90 degrees, based on design and or performance requirements. The coaxial transition 257 extends generally laterally through the monocone cavity 255 and through a channel 258 connected to the monocone cavity 255. The channel 258 allows the coaxial transition 257 to extend from the cylindrical shell 254 without touching portions of the monocone 256. The coaxial transition 257 connects to the monocone matching network 270. Although not shown in FIG. 2G, the coaxial transition 257 forms a single integrated piece with the monocone matching network 270. The coaxial transition 257 has a cylindrical shape or a generally circular cross section but may have different shapes and/or radii.

The structure of the coaxial transition 257 extending through the channel 258 may be difficult or unfeasible to produce using conventional manufacturing processes and may require additive manufacturing processes. In addition, it may be difficult to solder a similarly designed coaxial transition 257 to the cylindrical shell 254.

Figure 2H:
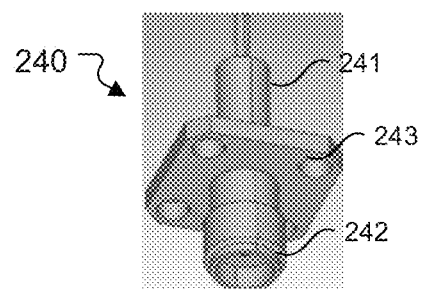
FIGS. 2H-2L show a matching network assembly of the antenna assembly of FIG. 2A, according to certain aspects.

FIG. 2H shows the monocone connector 240, which includes a connector end 242 for an SMA connection, holes 243 for mounting, and a connector end 241 for connecting to the monocone matching network 270.

Figure 2J:
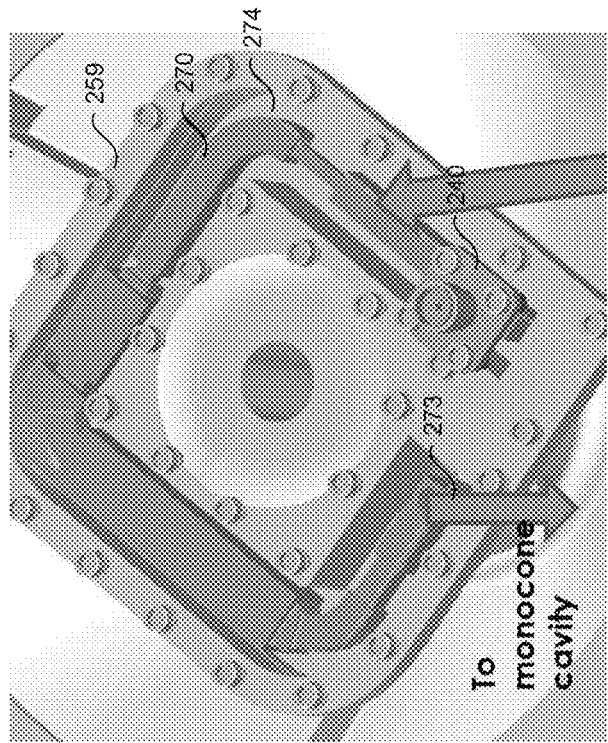
Figure 2L:
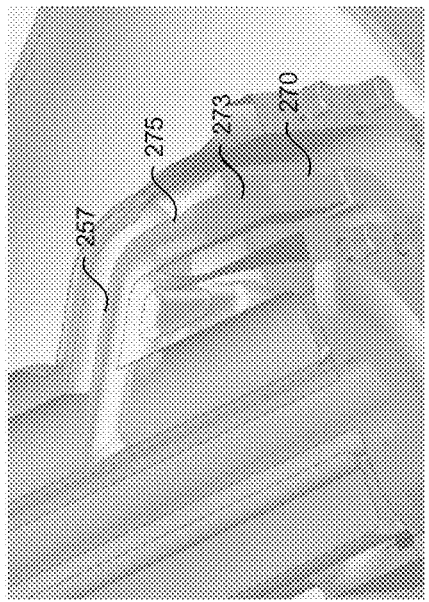
Figure 2I:
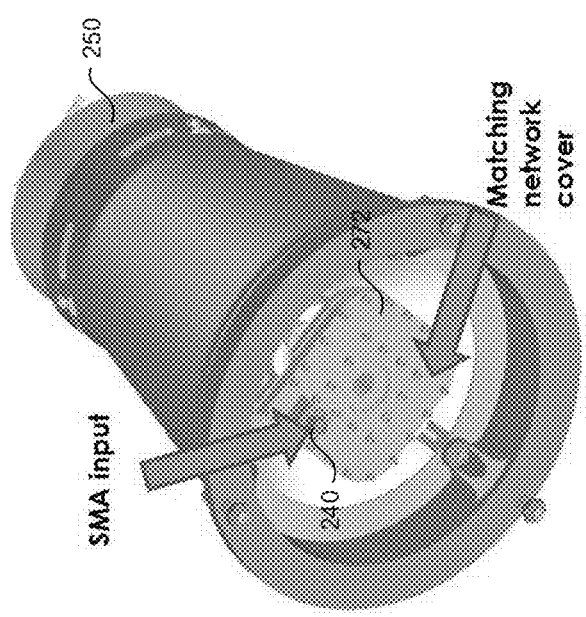

FIG. 2I shows a bottom view of the omni antenna assembly 250, which includes a matching network cover 272. The monocone connector 240 allows connection to the monocone matching network 270 through the matching network cover 272. The monocone connector 240 is an SMA connector, although the monocone connector 240 may be a different adapter as needed.

FIG. 2J shows the matching network cover 272 removed. A matching network channel 274 houses the monocone matching network 270. The monocone connector 240 attaches to one end of the monocone matching network 270. The monocone matching network 270 includes a transition bend 273 which connects to the coaxial transition 257 (in FIG. 2F).

Figure 2K:
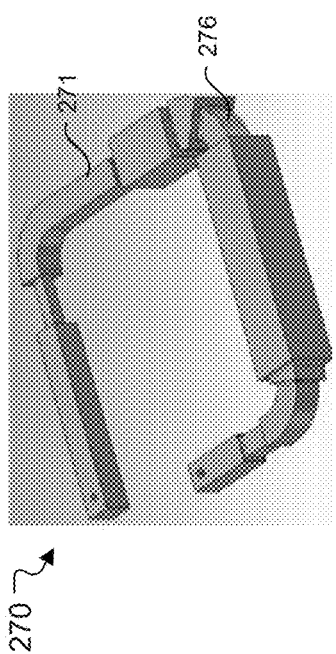

FIG. 2K shows the monocone matching network 270, which includes a rod 276 and one or more stubs 271. Although FIG. 2K shows the monocone matching network 270 in isolation, the monocone matching network 270 forms a single integrated piece with the coaxial transition 257. The rod 276 includes one or more bends within a plane, which is perpendicular to an axis of the cylindrical shell 254. In FIG. 2K the rod 276 includes three bends in plane, which provide impedance matching. The stubs 271 changes cross section size of the monocone matching network 270 to provide a wide band impedance match for the monocone 256. The stubs 271 are rectangular in shape in FIG. 2K, but may be circular or another shape. The bends and stubs 271 are selected to meet performance requirements.

In addition, the monocone matching network 270 transitions from the rectangular shape in FIG. 2K to the circular shape of the coaxial transition 257. The monocone matching network 270 may be manufactured as a single integrated piece with the coaxial transition 257, as seen in FIG. 2L. FIG. 2L shows a cutaway view of the coaxial transition 257, a tapered portion 275, the transition bend 273, and the monocone matching network 270. The transition bend 273 bends out of the plane for transitioning to the coaxial transition 257 by way of the tapered portion 275. The tapered portion 275 is near the transition bend 273. The tapered portion 275 has a cross section which tapers from the generally rectangular cross section of the monocone matching network 270 to the generally circular cross section of the coaxial transition 257. The tapered portion 275 connects the coaxial transition 257 and the monocone matching network 270 as a single integrated piece rather than using a connector. Due to the reduced PIM and improved impedance matching, the integrated monocone matching network 270 and coaxial transition 257 may be usable for high power applications.

Figure 2M:
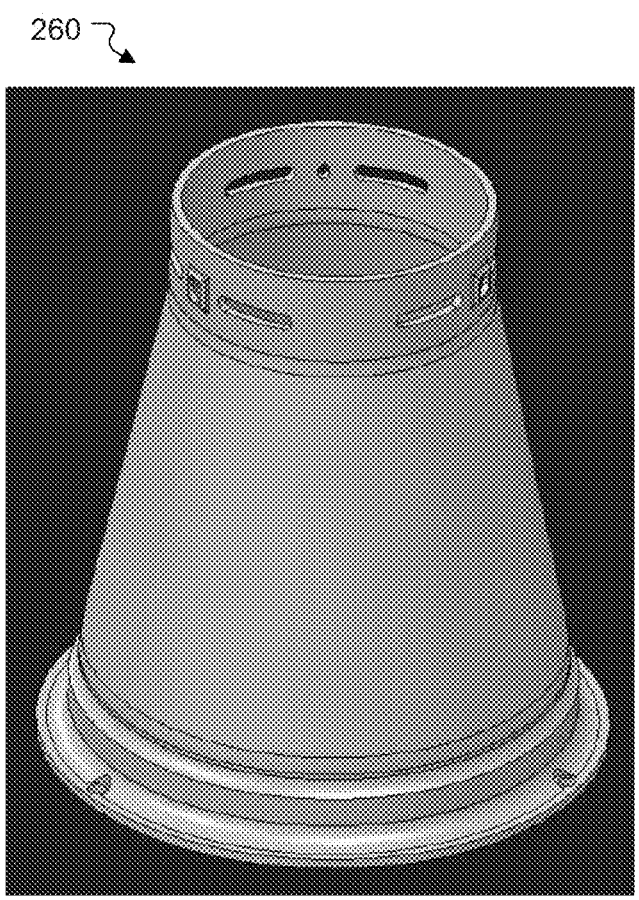
FIGS. 2M-2O show a radome housing for the antenna assembly of FIG. 2A, according to certain aspects.
Figure 2N:
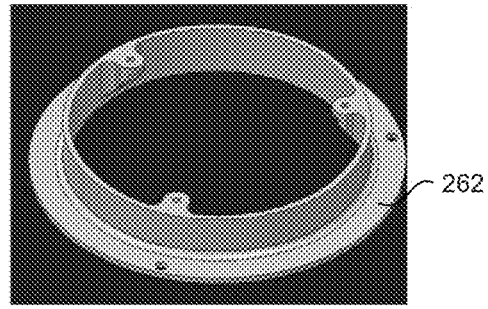
Figure 2O:
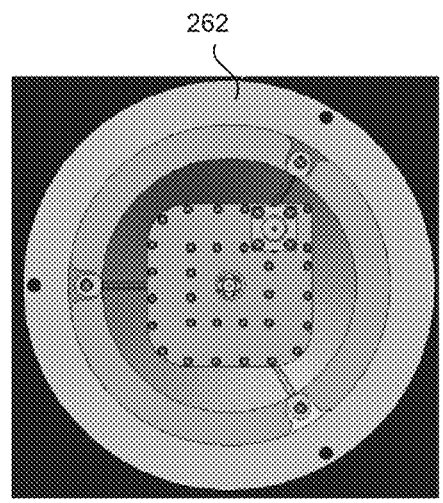

FIG. 2M shows a radome 260 for housing the omni antenna assembly 250. The radome 260 connects to the dipole cavity structure 251 (in FIG. 2F) and a base of the monocone 256 (in FIG. 2F) as can be seen in FIG. 2A. FIG. 2N shows a base ring 262 which attaches to the base of the monocone 256. A bottom view of the base ring 262 attached to the monocone 256 is shown in FIG. 2O.

Figure 2P:
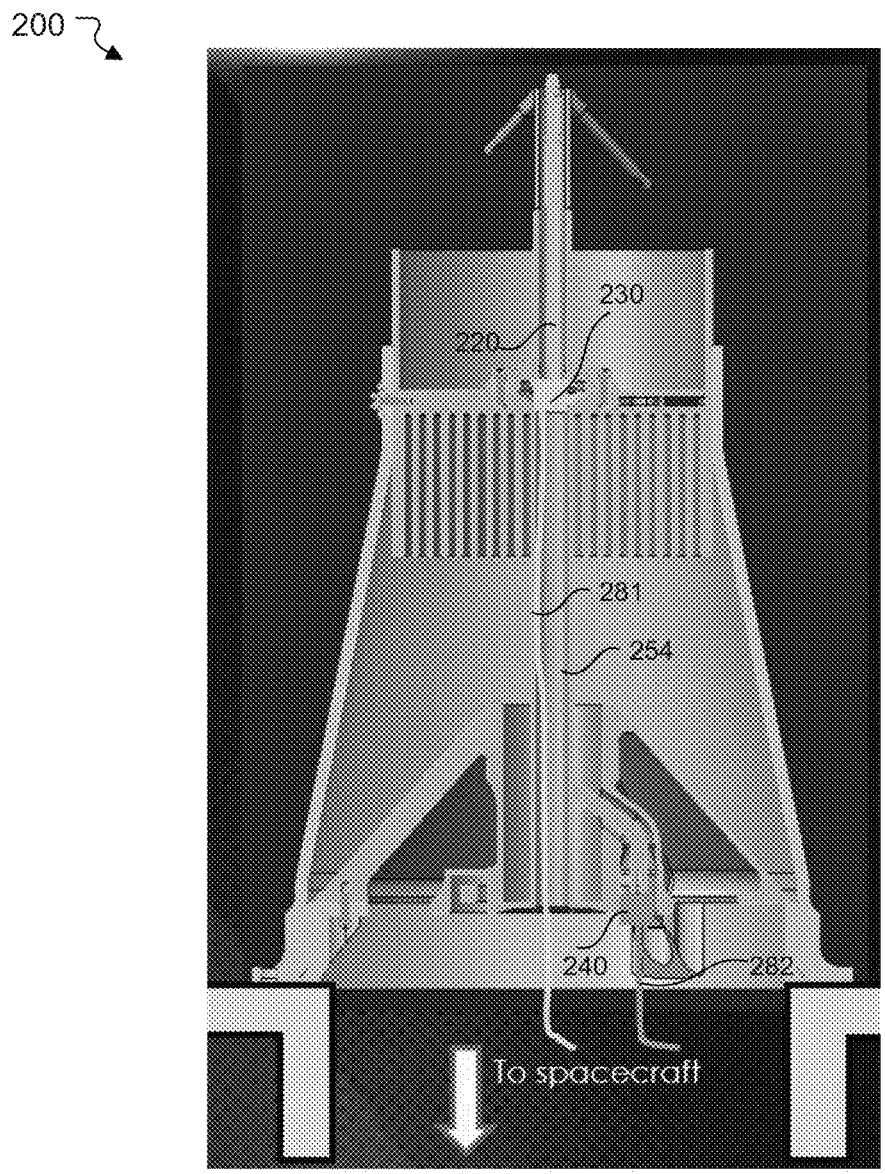
FIG. 2P shows cable for the antenna assembly of FIG. 2A, according to certain aspects.

FIG. 2P shows the antenna assembly 200. A dipole cable 281 is connected to the center conductor matching network 220 through the dipole connector 230. The dipole cable 281 is snaked through the cylindrical shell 254 to provide an input connection. A monocone cable 282 connects to the monocone matching network through the monocone connector 240 to provide another input. The dipole cable 281 and the monocone cable 282 provide 15 ohm inputs, which are transitioned to 377 ohms by the center conductor matching network 220 and the monocone matching network 270, respectively. The inputs may differ based on the telecommunication platform, and the center conductor matching network 220 and the monocone matching network 270 may be configured for different outputs as needed.

Figure 3A:
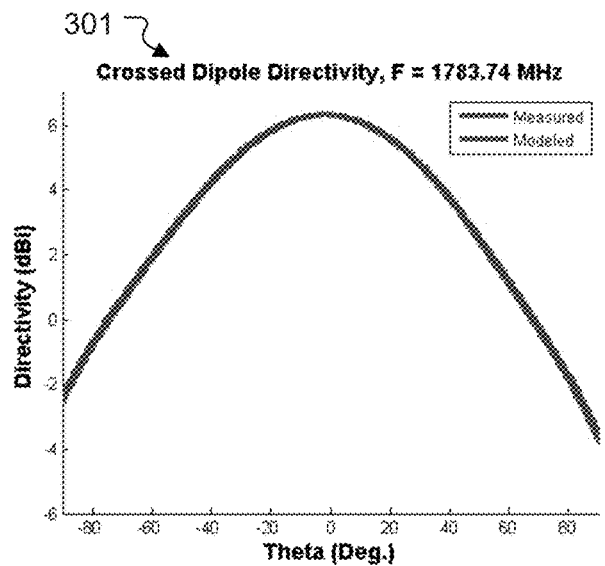
FIGS. 3A-3D show performance graphs of the antenna assembly of FIG. 2A, according to certain aspects.
Figure 3B:
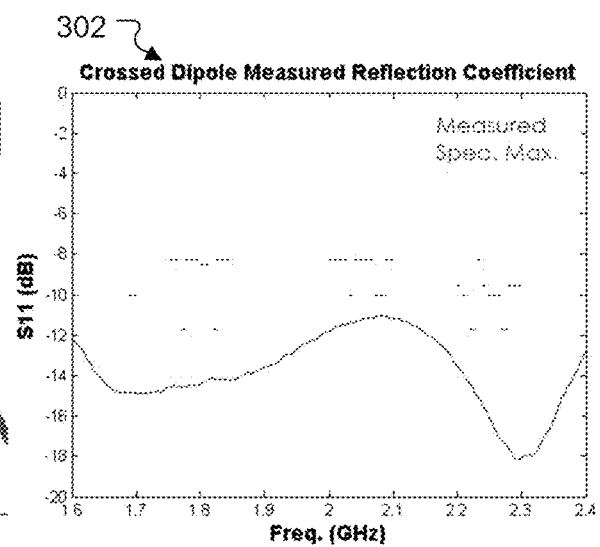

FIG. 3A shows a graph 301 of directivity for the dipole antenna 210. The dipole antenna 210 exhibits a measured directivity similar to a modeled directivity. FIG. 3B shows a graph 302 of measured reflection coefficient for the dipole antenna 210. As seen in FIG. 3B, the measured reflection coefficient is below maximum thresholds. Thus, the dipole antenna 210 demonstrates wide band performance meeting performance requirements.

Figure 3C:
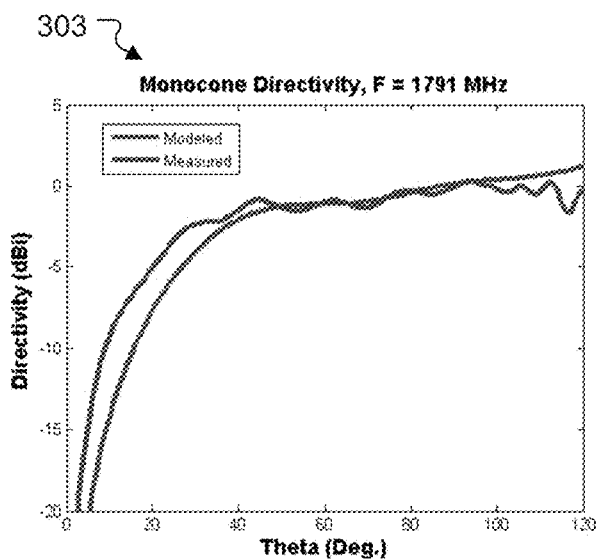
Figure 3D:
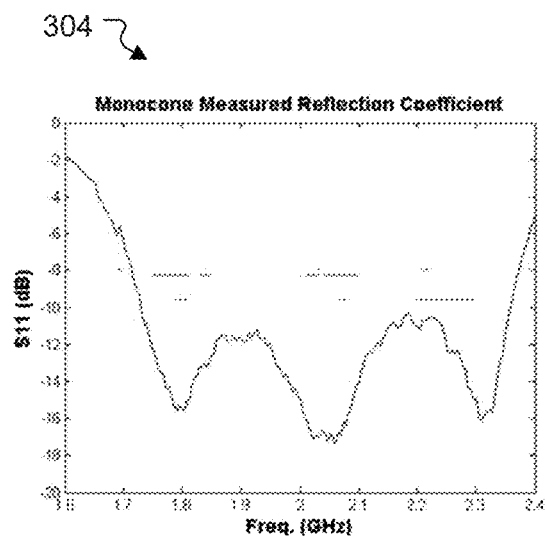

FIG. 3C shows a graph 303 of directivity for the monocone 256. The monocone 256 exhibits a measured directivity generally similar to the modeled directivity. FIG. 3D shows a graph 304 of measured reflection coefficient for the monocone 256. The measured reflection coefficient is generally below maximum thresholds. Thus, the monocone 256 demonstrates wide band performance meeting performance requirements.

The antenna assembly 200 is suitable for high power applications, in contrast to the antenna assembly 100, which may not be as suitable. The antenna assembly 200 is more resistant to PIM than the antenna assembly 100. In addition, the antenna assembly 200 is cheaper and simpler to manufacture than the antenna assembly 100.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus for an omni antenna, the apparatus comprising:
    a conical structure comprising a base and a monocone cavity;
    a cylindrical shell extending from the base and through the monocone cavity;
    a coaxial transition extending radially outward from the cylindrical shell;
    a matching network comprising a rod having one or more bends within a plane perpendicular to an axis of the cylindrical shell and a transition bend out of the plane to connect to the coaxial transition, wherein the coaxial transition and the matching network comprise a single integrated piece; and
    a dipole cavity structure comprising a cavity section and a corrugated section opposite the cavity section.

2. The apparatus of claim 1, wherein the base comprises a channel for housing the matching network.

3. The apparatus of claim 1, wherein the monocone cavity comprises an opening in a sidewall of the monocone cavity and the coaxial transition extends through the opening towards the base.

4. The apparatus of claim 1, wherein the conical structure, the cylindrical shell, the coaxial transition, the matching network, and the dipole cavity structure comprise the single integrated piece.

5. The apparatus of claim 1, wherein the corrugated section comprises a plurality of concentric rings extending away from the cavity section.

6. The apparatus of claim 1, wherein the cavity section comprises a hollow cylinder.

7. The apparatus of claim 6, further comprising a dipole antenna housed in the hollow cylinder.

8. An omni antenna assembly comprising:
    a dipole cavity structure comprising a cavity section and a corrugated section opposite the cavity section;
    a conical structure comprising a base and a monocone cavity; and
    a cylindrical shell extending from the base and through the monocone cavity and connecting the dipole cavity structure to the conical structure,
    wherein the dipole cavity structure, the conical structure, and the cylindrical shell comprise a single integrated piece.

9. The omni antenna assembly of claim 8, further comprising:
    a coaxial transition extending radially outward from the cylindrical shell;
    a matching network comprising a rod having one or more bends within a plane perpendicular to an axis of the cylindrical shell and a transition bend out of the plane to connect to the coaxial transition; and
    a tapered portion connecting the coaxial transition and the matching network near the transition bend,
    wherein the coaxial transition, the matching network, and the tapered portion comprise the single integrated piece.

10. The omni antenna assembly of claim 9, wherein the monocone cavity comprises an opening in a sidewall of the monocone cavity and the coaxial transition extends through the opening towards the base, and wherein the base comprises a channel for housing the matching network.

11. The omni antenna assembly of claim 9, wherein the coaxial transition has a generally circular cross section, the matching network has a generally rectangular cross section, and the tapered portion has a cross section which tapers from the generally rectangular cross section to the generally circular cross section.

12. The omni antenna assembly of claim 8, wherein the corrugated section comprises a plurality of concentric rings extending away from the cavity section.

13. The omni antenna assembly of claim 8, further comprising a dipole antenna housed in the cavity section.

14. An antenna comprising:
    a dipole antenna;
    a center conductor matching network within the dipole antenna;
    an omni antenna assembly comprising:
    a dipole cavity structure comprising a cavity section and a corrugated section opposite the cavity section;
    a conical structure comprising a base and a monocone cavity;
    a cylindrical shell extending from the base and through the monocone cavity and connecting the dipole cavity structure to the conical structure;
    a coaxial transition extending radially outward from the cylindrical shell, the coaxial transition having a generally circular cross section;

a matching network comprising a rod having one or more bends within a plane perpendicular to an axis of the cylindrical shell and a transition bend out of the plane to connect to the coaxial transition, the rod having a generally rectangular cross section; and a tapered portion connecting the coaxial transition and the matching network near the transition bend, the tapered portion having a cross section which tapers from the generally rectangular cross section to the generally circular cross section, wherein the base comprises a channel for housing the matching network, the monocone cavity comprises an opening in a sidewall of the monocone cavity and the coaxial transition extends through the opening towards the base, and the omni antenna assembly comprises a single integrated piece.

15. The antenna of claim 14, wherein the corrugated section comprises a plurality of concentric rings extending away from the cavity section.

16. The antenna of claim 14, further comprising a radome connected to the dipole cavity structure and the conical structure.

17. The antenna of claim 14, further comprising:
a monocone connector connected to the matching network;
a monocone cable coupled to the matching network through the monocone connector;
a dipole connector connected to the center conductor matching network; and
a dipole cable coupled to the center conductor matching network through the dipole connector, the dipole cable extending through the cylindrical shell.

18. An apparatus for an omni antenna, the apparatus comprising:
a conical structure comprising a base and a monocone cavity;
a cylindrical shell extending from the base and through the monocone cavity;
a coaxial transition extending radially outward from the cylindrical shell;
a matching network comprising a rod having one or more bends within a plane perpendicular to an axis of the cylindrical shell and a transition bend out of the plane to connect to the coaxial transition, wherein the coaxial transition and the matching network comprise a single integrated piece, and the coaxial transition has a generally circular cross section and the matching network has a generally rectangular cross section; and
a tapered portion connecting the coaxial transition and the matching network near the transition bend, wherein the tapered portion has a cross section which tapers from the generally rectangular cross section to the generally circular cross section.

* * * * *